United States Patent
Tan

(10) Patent No.: US 8,719,272 B2
(45) Date of Patent: May 6, 2014

(54) SHARING OF AUDIO FILES AND SELECTED INFORMATION INCLUDING TAGGING INFORMATION

(75) Inventor: Min-Liang Tan, Singapore (SG)

(73) Assignee: Jook, Inc., Carlsbad, CA (US)

( * ) Notice: Subject to any disclaimer, the term of this patent is extended or adjusted under 35 U.S.C. 154(b) by 689 days.

(21) Appl. No.: 11/969,400

(22) Filed: Jan. 4, 2008

(65) Prior Publication Data
US 2008/0177780 A1    Jul. 24, 2008

Related U.S. Application Data

(63) Continuation-in-part of application No. 11/625,692, filed on Jan. 22, 2007, now Pat. No. 7,817,960.

(51) Int. Cl.
*G06F 7/00* (2006.01)
*G06F 17/30* (2006.01)

(52) U.S. Cl.
CPC .... *G06F 17/30749* (2013.01); *G06F 17/30752* (2013.01); *Y10S 707/916* (2013.01)
USPC .......................................... 707/740; 707/916

(58) Field of Classification Search
CPC .................... G06F 17/30749; G06F 17/30752
See application file for complete search history.

(56) References Cited

U.S. PATENT DOCUMENTS

| | | | |
|---|---|---|---|
| 6,505,160 B1 * | 1/2003 | Levy et al. | 704/270 |
| 6,973,451 B2 * | 12/2005 | Laronne et al. | 360/39 |
| 7,028,058 B2 * | 4/2006 | Russon | 1/1 |
| 7,302,224 B2 * | 11/2007 | Sibley et al. | 455/3.02 |
| 7,412,459 B1 * | 8/2008 | Johnson et al. | 700/74 |
| 7,493,341 B2 * | 2/2009 | Israel et al. | 1/1 |
| 2002/0048224 A1 * | 4/2002 | Dygert et al. | 369/1 |
| 2002/0052885 A1 * | 5/2002 | Levy | 707/200 |
| 2004/0034650 A1 * | 2/2004 | Springer et al. | 707/102 |
| 2004/0267715 A1 * | 12/2004 | Polson et al. | 707/3 |
| 2008/0092168 A1 * | 4/2008 | Logan et al. | 725/44 |
| 2008/0175403 A1 * | 7/2008 | Tan et al. | 381/77 |
| 2008/0176508 A1 * | 7/2008 | Tan | 455/3.01 |
| 2008/0176511 A1 * | 7/2008 | Tan et al. | 455/3.06 |
| 2008/0177751 A1 * | 7/2008 | Tan | 707/10 |
| 2008/0177765 A1 * | 7/2008 | Tan | 707/100 |
| 2008/0177781 A1 * | 7/2008 | Tan | 707/102 |
| 2008/0177972 A1 * | 7/2008 | Tan | 711/171 |
| 2008/0306921 A1 * | 12/2008 | Rothmuller et al. | 707/3 |
| 2010/0029196 A1 * | 2/2010 | Tan | 455/3.01 |

* cited by examiner

*Primary Examiner* — Mariela Reyes
(74) *Attorney, Agent, or Firm* — Ming Chow; Sinorica, LLC

(57) ABSTRACT

A media data tagging method. The media data includes one or a combination of audio, video and textual data. The method includes surveying at least a portion of media data received by a device, the media data having metadata associated therewith. The surveying process is preferably performed during playback of the media data. The method further includes detecting generation of a tagging instruction. The tagging instruction can be generated via a user interface. A tag data indicative of the media data is then generated in response to the generation of the tagging instruction. The tag data is then transmitted to the device. The tag data is for subsequent at least one of identification and location of the media data.

28 Claims, 5 Drawing Sheets

SHARING OF AUDIO FILES AND SELECTED INFORMATION INCLUDING TAGGING INFORMATION

RELATED APPLICATION

This application is a continuation-in-part of U.S. Ser. No. 11/625,692 filed Jan. 22, 2007, and claims the benefit thereof.

FIELD OF INVENTION

The present invention relates generally to the field of wireless communications. More particularly, the present invention relates to wireless communication of audio and related information among devices.

BACKGROUND

Many prior art media devices can receive radio broadcasts from such sources such as FM, AM or satellite broadcasts. With respect to headphones, wireless headphones receive music from media devices via a variety of methods, such as infrared transmission, 25 mhz radio or 2.4 ghz radio transmission technologies such as Bluetooth. Media devices can transfer media files such as audio and/or video files wirelessly between other similar media devices via similar methods. The transferring of such files is usually from one storage medium to another.

Despite certain advantages of the foregoing, wired headphones and/or earbuds suffer from limitations. Some such systems allow one user to share the music experience by passing one wired headphone or earbud to a third party. This shared experience, however, does not allow the third party to experience the full stereo experience of the music. Headphone adapter jacks exist for two wired headphones to be connected to the same media device but this also requires both users to be tethered close to the same media device. Shared music by transfer of media files from one storage medium to other storage medium often infringes upon third party intellectual property rights.

Most prior art wireless headphones do not allow users to share music from the same media device such as an MP3 player. Wireless headphones are also limited to the range of the wireless transmitter—consequently, users suing wireless headphones cannot be too far from the source. Also, general transmission techniques such as Bluetooth are generally accessible to anyone having the capability to receive that data.

Audio sounds can come from a variety of devices such as a digital media player like the Apple iPod®, a CD player or even a radio transmitting commercial radio broadcasts. It is also desirable to obtain, communicate and/or store information about audio files or audio sounds. Most audio files in the popular MP3 and ACC formats contain identification information such as an ID3 tag. An ID3 tag is typically contained within or associated with an audio file and is stored in a prescribed format. Information about audio files typically includes the artist name, audio file title and year of commercial release and genre of the audio file.

With prior art digital commutations devices that communicate audio sounds, information about the audio sounds is shared in a very limited way, if at all. Very often, shared information is limited or insufficient, making it difficult for the user receiving the information to adequately characterize the audio file or audio sounds. Furthermore, prior art digital communication devices currently do not allow users to specifically choose or tag a particular type or content of information relating to the audio file or audio sounds.

In view of the foregoing, there is a need for a system and method for enabling a device and the device's user to selectively tag or obtain information relating to the audio file or audio sound.

SUMMARY

In accordance with a first aspect of the invention, there is disclosed a media data tagging method comprising surveying at least a portion of media data receivable from a device. The media data comprises at least one of audio, video and textual data, the at least one of audio, video and textual data having metadata associated therewith. The media data tagging method further comprises detecting generation of a tagging instruction and generating tag data being indicative of the media data in response to the tagging instruction being generated. The tag data is for subsequent at least one of identification and location of the media data.

In accordance with a second aspect of the invention, there is disclosed a device-readable medium having stored therein a plurality of programming instructions. The plurality of programming instructions when executed on a device causes the device to survey at least a portion of media data receivable from a device. The media data comprises at least one of audio, video and textual data, the at least one of audio, video and textual data having metadata associated therewith. The plurality of programming instructions when executed further causes the device to detect generation of a tagged tagging instruction and to generate tag data being indicative of the media data in response to the tagging instruction being generated. The tag data is for subsequent at least one of identification and location of the media data.

In accordance with a third aspect of the invention, there is disclosed a media data tagging system comprising means for surveying at least a portion of media data receivable from a device. The media data comprises at least one of audio, video and textual data, the at least one of audio, video and textual data having metadata associated therewith. The media data tagging system further comprises means for detecting generation of a tagging instruction and means for generating tag data being indicative of the media data in response to the tagging instruction being generated. The tag data is for subsequent at least one of identification and location of the media data.

BRIEF DESCRIPTION OF THE DRAWINGS

Embodiments of the invention are described hereinafter with reference to the following drawings, in which.

DESCRIPTION

With reference to the drawings, preferred embodiments of the invention for providing a system and a method for enabling selective tagging of information relating to a media file being stored in a device, shared between devices and/or transmitted between devices is described hereinafter.

Systems and methods for transmitting media files and their related information are known in the art. Media files can be one or a combination of audio data, video data and textual data. Related information of a media file is transmitted as metadata, usually as a header or a footer of the media file. Related information can include a title of the media file, an artist of the media file and a size of the media file. However, the metadata does not always contain sufficient information relating to the media file. In such a situation, a user of the device is unable to adequately identify, classify or evaluate the media file. This thereby results in a wrong or an undesired media file being shared and/or transmitted. The system and method for enabling selective tagging of information relating to an media file allows the user to share, transmit, receive and request a specifically defined or characterized media file according to specifically selected parameters.

For purposes of brevity and clarity, description of the invention is limited hereinafter to media devices capable of selectively tagging information on a media file. This however does not preclude various embodiments of the invention from other applications that require a similar operating performance. Functional and operational principles upon which embodiments of the invention are based on remain the same throughout the various embodiments.

The device is preferably a standalone device which can include media (for example, audio and video) playback, telecommunication or personal digital assistant (PDA) functionalities. Alternatively, the device is a dongle couplable to a media device, a telecommunication device, a PDA or a similar device.

Dedicated and Broadcast Use

Figure 1:
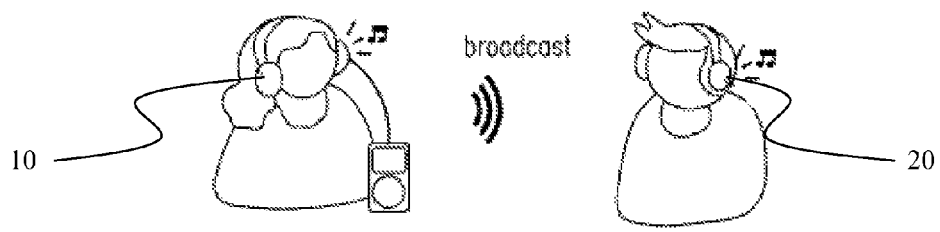
FIG. 1 illustrates a schematic view of a person sharing media and related information in accordance with one aspect of the present invention.

As shown in FIG. 1, the user of a first device 10 can opt to only transmit a dedicated signal from the first device to a second device 20; in this instance, the second device 20 will be the only receiving device for the first device 10. The second device 20 decodes the signal from the first device 10 to provide the user of the second device 20 with the appropriate/desired media. As set forth below in further detail, in a preferred embodiment, selected information relating to the media file is shared as well.

As used herein, the term "dedicated" is used to refer to a closed network, whereby only users of that network may have ready access to the decoding and/or decrypting technology to access the communicated signals. A "closed network can refer to a network that employs proprietary technology that is not directly interoperable with other standards-based networks, or that adds an additional layer of encoding onto standards-based networks. A "closed network" also encompasses a private network that can only be used by authenticated or authorized devices; e.g. outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Information relating the media file may also be encrypted to provide a further layer of security to information communication between devices. Encryption can be used to secure information communications and stored information. Digital communications accommodate the use of encryption. As consumers continue to move from wireline to wireless communications devices, the use of encryption has become more important to the end user in some contexts.

Figure 2:
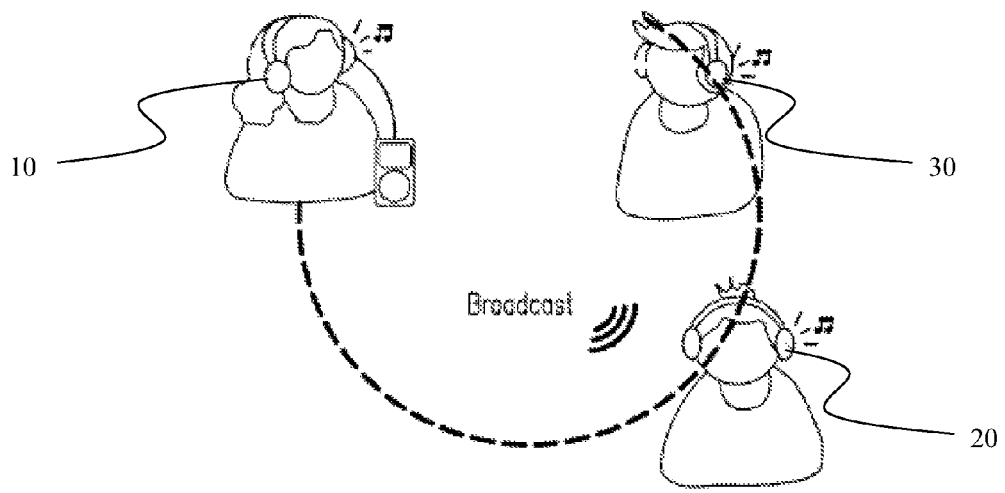
FIG. 2 illustrates a schematic view of a plurality of persons sharing media (and data) from a single source in accordance with one aspect of the present invention.
Figure 3:
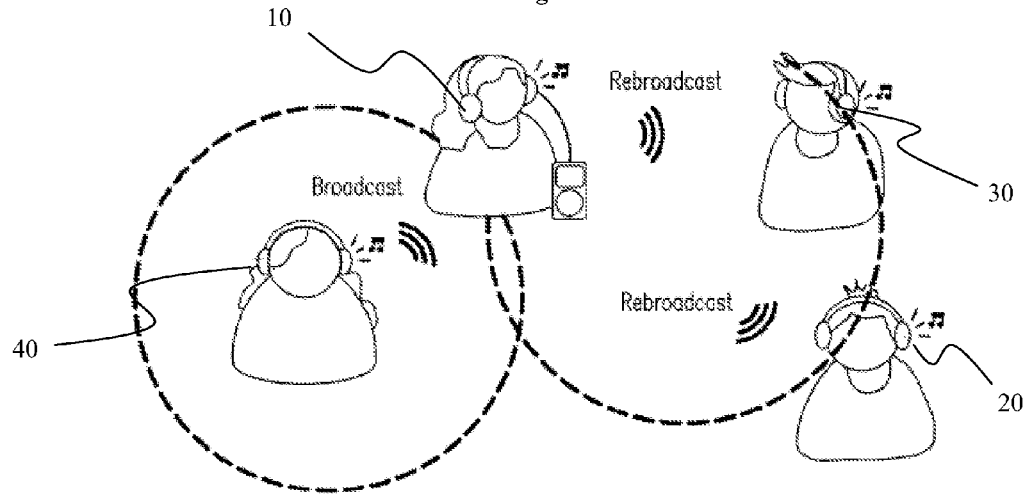
FIG. 3 and FIG. 4 illustrate other embodiments of the invention in which a plurality of rebroadcasts occur.

Referring now to FIG. 2, a user of the first device 10 can opt to set the first device 10 to broadcast. As such, enabled third parties in the range of transmission of the first device 10, such as the user of a third device 30 and potentially others, can opt to set their respective devices to receive from the first device 10, or on a channel on which the first device 10 is set to transmit. The third device 30 and others can now decode the signal from the first device 10 to provide the user of the third device 30 and some others with the appropriate/desired media file. As shown in FIG. 3, the user of the first device 10 can also opt to set the first device 10 to receive from other transmitting devices (e.g. a fourth device 40) belonging to other users.

Rebroadcasting

Figure 4:
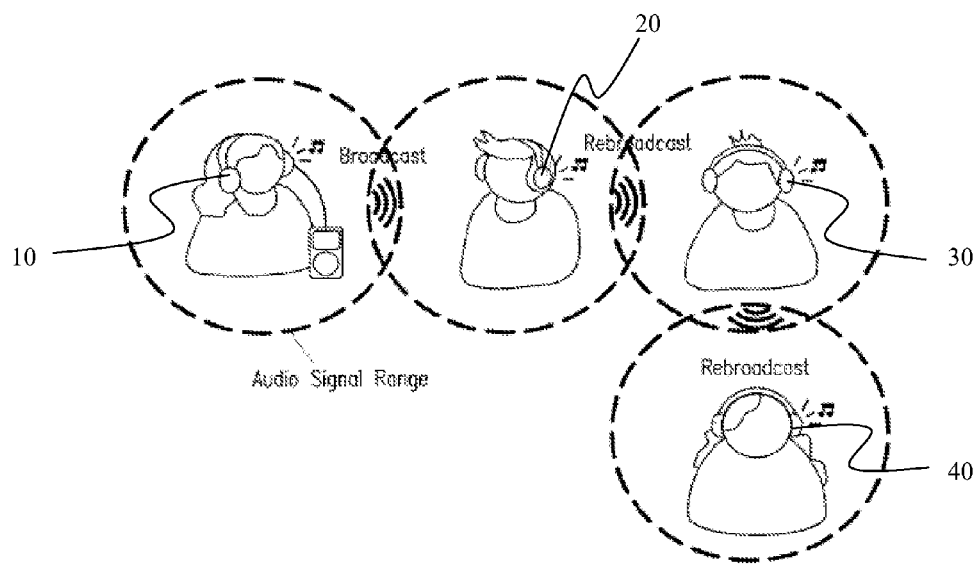

The system and method of the present invention can also be used in the context of re-broadcasting. For example, as shown in FIG. 4, with the user can set the first device 10 on broadcast, the user of the second device 20 which is receiving the media file can opt to set the second device 20 to receive the media file from the first device 10 and to simultaneously re-broadcast the same media file to other users' devices (for example, the third device 30 and the fourth device 40). Alternatively, the second device 20 can simultaneously receive the media file from first device 10 as well as transmit media files already stored within the second device 20 to other users' devices.

Rebroadcasting may be undertaken before or after decoding the signals; if the latter, the signal will be encoded prior to being retransmitted. The encoding may be the same as, or in some applications different from, the original encoding.

Rebroadcasting thus allows user of a device who is out of the range of the first device 10 but in the range of the re-broadcast of 20 to receive the appropriate media file from the first device 10 via the second device 20. Likewise, if the user of the third device opts to set the third device 30 to re-broadcast, the user of the fourth device 40, who is out of the range of the broadcast of the first device 10 and the rebroadcast of the second device 20, can opt to set the fourth device 40 to receive the appropriate media file from the first device 10 via the second device 20 and the third device 30. For all the applications above, the users of the second device 20, the third device 30 and the fourth device 40 can also set their respective devices to receive the appropriate media files which are being re-broadcasted.

Figure 5:
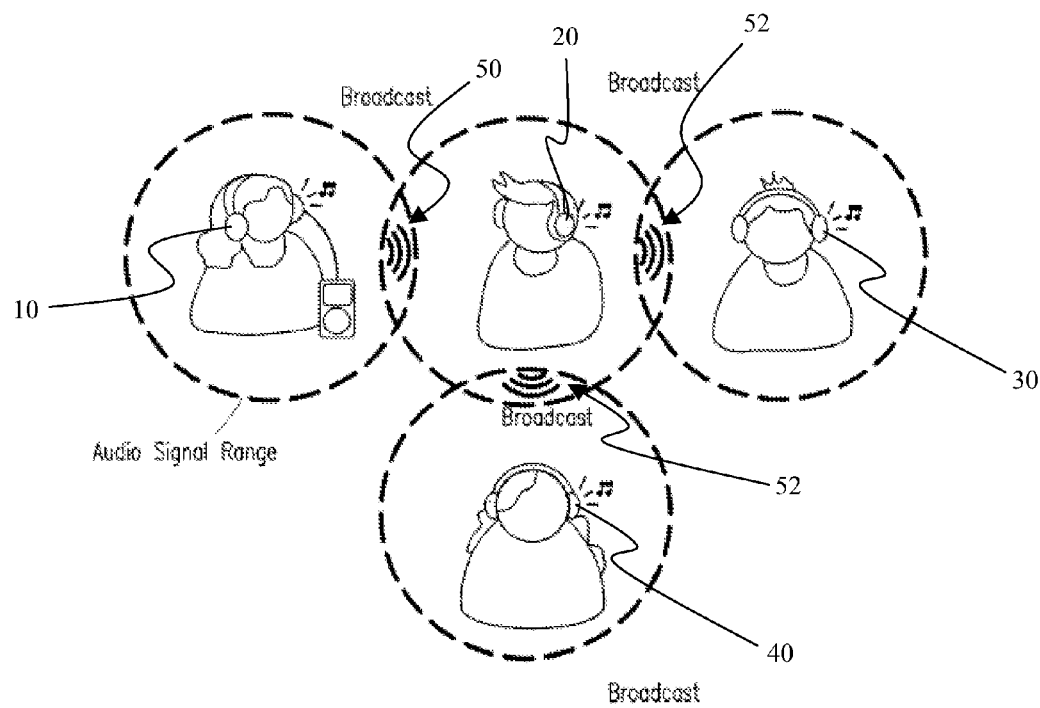
FIG. 5 illustrates another embodiment of the invention in which a plurality of broadcasts occur, and in which differing audio signals and related information may be communicated among the various devices.

FIG. 5 depicts an alternative embodiment of the invention that enables use with the simultaneous reception and transmission/broadcast of different media files. As shown in FIG. 5, the user of the first device 10 can set the first device 10 to transmit or broadcast a certain signal 50. The user of the second device 20 can set his device to receive the transmission/broadcast of the certain signal 50 from the first device 10. The user of the second device 20 can simultaneously opt to set the second device 20 to transmit or broadcast a different signal 52 on a different channel which can be received by users of, for example, the third device 30 and the fourth device 40 provided that they have set their respective devices to receive the transmission or broadcast of the different signal 52 on that channel from the user of the second device 20.

The setting of the device to receive, to transmit or to simultaneously transmit and receive can be selected manually by the user of the device by operating a user interface formed on the device. Alternatively, the setting of the device to receive, to transmit or to simultaneously transmit and receive is performed automatically upon detection of signals from another device.

The invention also enables use in multi-channel transmission or broadcast (simultaneous or otherwise). With multiple users transmitting in a limited range, the implementation of the wireless transmission may be made un-dedicated channels which users may opt to receive either:
   i. automatically via hunting and/or frequency hopping; or
   ii. manually by tuning to specific frequencies denoted by:
     a. discrete channels denoted by numbers (e.g. Channel 1, Channel, etc);
     b. discrete channels denoted with colors (e.g. Red, Green, Blue); or
     c. other methods consistent with those known to persons of skill in the art.

In order to identify the mode in which a device is operating (transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:
   a. visual cues, including text, colored indicators or lights, which will indicate the various modes in which the device is operating; and
   b. sound cues which will indicate the various modes in which the device is operating. Such sounds can either be heard audibly or through use of the device.
(e.g., the first device 10 is set to broadcast. The first device 10 flashes a blue light which users of other Devices (e.g. the second device 20 and the third device 30) can see and then opt to set the second device 20 and the third device 30 to receive the first device's broadcast.)

Tagging Selected Information

A user of a receiving device 60 can selectively tag information related to a media file stored in a transmitting device or broadcasting device 70. As previously mentioned, the media file can be one or a combination of audio data, video data and textual data. The information can include, though it is not limited to, information contained in the ID3 tag (also known as a metadata container) of media files or in other such similar places and information that may be manually inserted by a user of the transmitting device 70.

The information can include, though is not limited to the following information fields:
   a. The title of the media file;
   b. The artist or group behind the media;
   c. The writer, author or creator of the media (for example, the writer of a song);
   d. The album or collection on which the media can be found;
   e. The genre of the media file;
   f. The year in which the media was commercially released;
   g. The encoding rate of the media file if it is a digital media file;
   h. The size of the media file if it is a digital media file; and
   i. Other desired information about the media file.

Each of the information fields contains data elements. The receiving device 60 can be set to receive data elements from any number of information fields. Additionally, the receiving device 60 can selectively tag any number of information fields.

Figure 6:
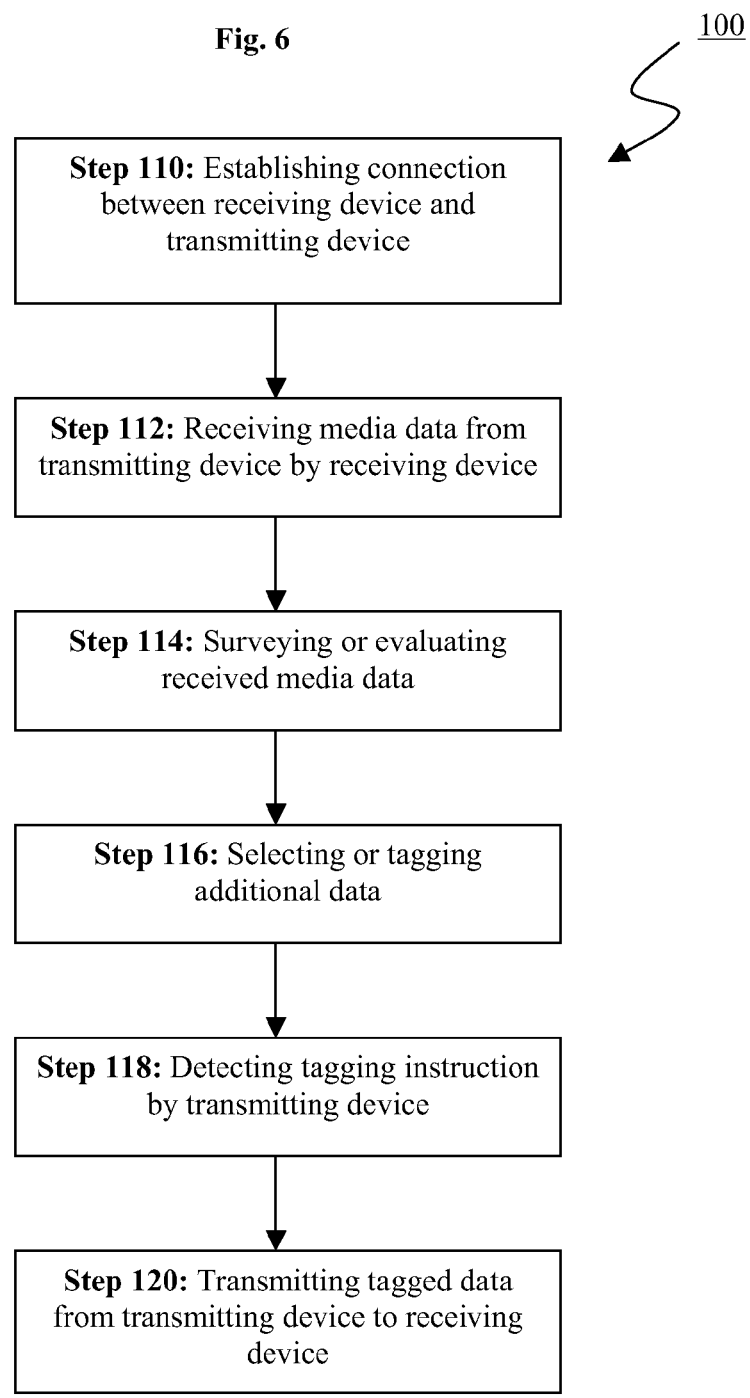
FIG. 6 illustrates a method for selectively tagging information in a transmitting device by a receiving device as provided by one aspect of the present invention.
Figure 7:
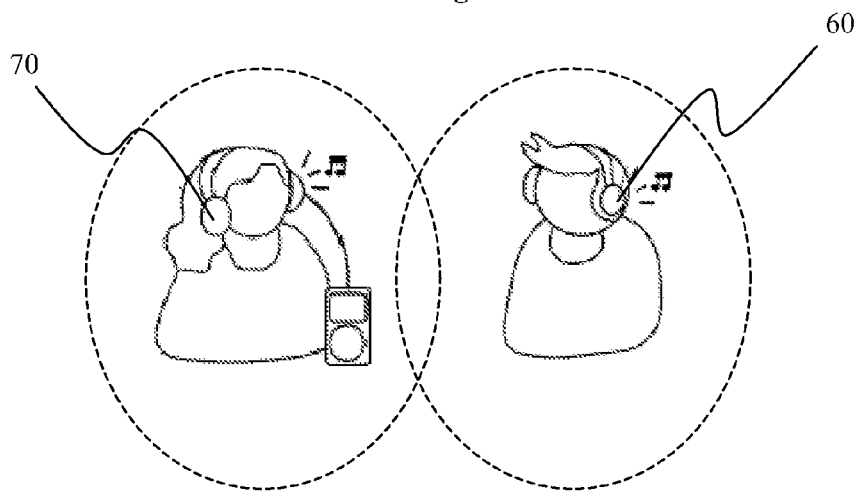
FIG. 7 illustrates a connection between the transmitting device and receiving device as in FIG. 6.
Figure 8:
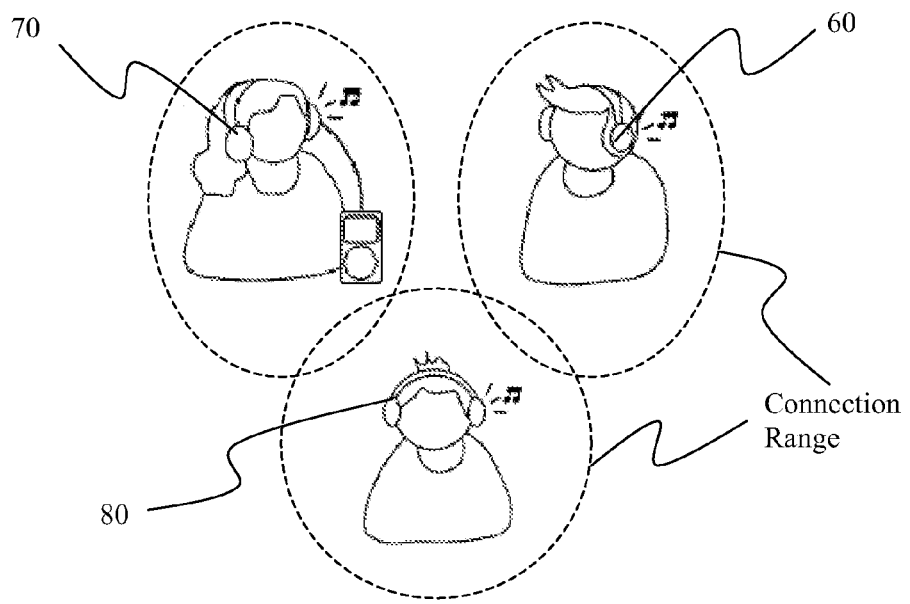
FIG. 8 illustrates a different connection pathway between the transmitting device and receiving device as in FIG. 6.

FIG. 6 shows a method 100 for selectively tagging media data or information as provided by the present invention. The method 100 comprises a first step 110 of establishing connection between the receiving device 60 and the transmitting device 70. The connection is preferably a dedicated connection or a direct broadcast as shown in FIG. 7. Alternatively, the connection occurs via a third re-broadcasting device 80 as shown in FIG. 8.

In a step 112, the receiving device 60 receives media data or information transmitted from the transmitting device 70. The receiving device 60 then surveys or evaluates the media data or information received in a step 114. The survey or evaluation of the media data or information is preferably performed during playback of the media (audio or video) data.

If the media data or information received is deemed incomplete or insufficient, the receiving device 60 then makes a selection or tags specific additional information fields as required by the user of the receiving device 60 in a step 116. Preferably, the selection is performed by the user of the receiving device 60 via the user interface. The user interface is for example a touch-screen interface or a keypad. The selection is preferably stored as a program in the receiving device 60. Alternatively, the selection is re-entered as and when desired by the user of the receiving device 60. Further alternatively, the selection or tagging of information is specifically directed to information fields that are missing or inadequately provided within the ID3 tag of the audio file received by the receiving device 60.

The transmitting device 70 detects the selection or tagging instruction in a step 118. The transmitting device 70 then generates the tagged or selected data or information and transmits this tagged data to the receiving device 60 in a step 120.

The user of the receiving device 60 is able to change the selection of information as desired. The receipt of the selected or tagged information allows the user of the receiving device 60 to make informed choices on whether to download, share, request for, reject or purchase the media file of the transmitting device 70. The ability to selectively tag information relating to the media file facilitates the characterization of the media file, thereby enhancing the audio downloading, sharing or purchasing experience.

In an embodiment of the present invention, the receiving device 60 automatically screens the playlist of the connected transmitting device to search for media files fitting or matching the tagged information or criteria. Upon detection of a fitting or matching media file, the receiving device 60 preferably alerts the user of the receiving device 60. Alternatively, the receiving device 60 automatically initiates transmission, sharing, download or purchase of the fitting or matching media file.

In a further embodiment of the present invention, the method 100 is performed upon initiation of sharing or transmission of the media file. The receipt of selectively tagged information provides the user of the receiving device 60 with desired relevant information on the media file. The receipt of selectively tagged information facilitates information gathering on the media file as desired, aids future recollection of the same media file as well as ensures informed purchase of the media file. The tagged information or data is also indicative of the media information or data and can be used for subsequent identification and location of the media information or data.

Upon receiving the selectively tagged information, the user of the receiving device 60 can opt to cancel the sharing or transmission of the media file as desired. Alternatively, the user of the receiving device 60 can opt to download the shared media file from the transmitting device 70 to his receiving device 60. Further alternatively, the user of the receiving device 60 can opt to purchase the shared or transmitted media file. In another embodiment of the present invention, the receiving device 60 performs the cancellation, download and/or purchase of the media file automatically.

Enabling selective tagging of information relating to the media file allows the user of the receiving device to select or dictate the information received. Furthermore, selective tagging of information enables the user of the receiving device to specifically characterize the media file, thereby facilitating an accurate and informed download, sharing and purchase. Ultimately, the present invention provides an enhanced media sharing, transmitting or purchase experience for the user of the receiving device.

A most preferred embodiment of the present invention provides a combined device that possesses capabilities of both the receiving device 60 and the transmitting device 70. The combined device is able to receive tagged information from the transmitting device 70, transmit tagged information to the receiving device 60 as well as simultaneously receive tagged information from the transmitting device 70 while transmitting tagged information to the receiving device 60.

The foregoing discussion focuses principally on the sharing of media files and related information. It is understood, however, that other applications will also be useful. For example, the application could be used in a gaming environment, in which it is desired that a number of players share a similar audio experience. For example, all such members may be sharing a communications "channel" in the virtual environment. In addition, the present invention could be advantageously applied in the areas of education and training.

While the present invention has been described with reference to particular embodiments, the present invention is not to be limited to the specific embodiments so described and illustrated.

The invention claimed is:

1. A metadata tagging method for transmitting metadata from a transmitting device to a receiving device, the tagging method comprising:
   determining at the receiving device whether a plurality of information fields of the metadata associated with a media file are complete;
   tagging at the receiving device an incomplete information field of the metadata;
   detecting the tagging of the incomplete information field of the metadata by the transmitting device;
   transmitting information related to the tagged incomplete information field to the receiving device; and
   generating information related to tagged incomplete information field of the metadata, comprising:
      providing at least one tagging data field, wherein each of the plurality of information fields associated with one of a plurality of data elements of the metadata;
      identifying one of presence and absence of at least one of the plurality of information fields associated with the metadata being an equivalent of the at least one tagging data field;
      capturing as the tag data the at least one of the plurality of data elements associated with the at least one of the plurality of information fields being an equivalent of the at least one tagging data field in response to presence thereof being identified;
      requesting from the device the at least one of the plurality of data elements associated with the at least one of the plurality of information fields being an equivalent of the at least one tagging data field in response to absence thereof being identified;
      storing the media file; and
      providing an indicator being indicative of the stored media file, the indicator being the tag data.

2. The method as in claim 1, further comprising establishing a connection between the transmitting device and the receiving device.

3. The method as in claim 2, wherein the connection between the transmitting device and the receiving device is a wireless connection.

4. The method as in claim 3, wherein the connection is established through a re-broadcasting device, wherein the re-broadcasting device is configured to establish a first connection with the receiving device and a second connection with the transmitting device.

5. The method as in claim 2, wherein determining whether the information fields are complete is performed after the media file is completely received by the receiving device.

6. The method as in claim 5, wherein determining whether the information fields are complete is performed during play back of the media file.

7. The method as in claim 2, wherein determining whether the information fields are complete is performed upon initiation of sharing of the media file by the transmitting device.

8. The method as in claim 1, wherein tagging the incomplete information field of the metadata received by the receiving device is performed using a user interface of the receiving device.

9. The method as in claim 1, wherein the media file comprises one of audio, video and textual data.

10. The method as in claim 1, wherein determining whether the information fields of the metadata are complete comprises:
    comparing each of the plurality of information fields associated with the metadata with at least one of a plurality of tagging criteria.

11. A non-transitory device readable medium including a program of instructions, wherein the program of instructions, upon being executed on a media device, cause the media device to perform a metadata tagging operation for transmitting metadata from a transmitting device to a receiving device, the metadata tagging operation comprising:
    determining at the receiving device whether a plurality of information fields of the metadata associated with a media file are complete;
    tagging at the receiving device an incomplete information field of the metadata;
    detecting the tagging of the incomplete information field of the metadata by the transmitting device;
    transmitting information related to the tagged incomplete information field to the receiving device; and
    generating information related to tagged incomplete information field of the metadata, comprising:
       providing at least one tagging data field, wherein each of the plurality of information fields associated with one of a plurality of data elements of the metadata;
       identifying one of presence and absence of at least one of the plurality of information fields associated with the metadata being an equivalent of the at least one tagging data field;
       capturing as the tag data the at least one of the plurality of data elements associated with the at least one of the plurality of information fields being an equivalent of the at least one tagging data field in response to presence thereof being identified; and
       requesting from the device the at least one of the plurality of data elements associated with the at least one of the plurality of information fields being an equivalent of the at least one tagging data field in response to absence thereof being identified.

12. The metadata tagging operation of claim 11, wherein the metadata tagging operation further comprises:
establishing a connection between the transmitting device and the receiving device prior to the receiving device determining whether the information fields are complete.

13. The metadata tagging operation of claim 12, wherein determining whether the information fields are complete is performed after the media file is completely received by the receiving device.

14. The metadata tagging operation of claim 13, wherein determining whether the information fields are complete is performed during play back of the media file.

15. The metadata tagging operation of claim 12, wherein determining whether the information fields are complete is performed upon initiation of sharing of the media file by the transmitting device.

16. The metadata tagging operation of claim 11, wherein tagging the incomplete information field of the metadata received by the receiving device is performed using a user interface of the receiving device.

17. The metadata tagging operation of claim 11, wherein the media file comprises one of audio, video and textual data.

18. The metadata tagging operation of claim 11, wherein determining whether the information fields of the metadata are complete comprises:
comparing each of the plurality of information fields associated with the metadata with at least one of a plurality of tagging criteria.

19. A metadata tagging system for transmitting metadata, the system comprising:
a receiving device configured to:
determine whether a plurality of information fields of the metadata associated with a media file are complete; and
tag an incomplete information field of the metadata; and
a transmitting device configured to:
detect the tagging of the incomplete information field of the metadata; and
transmit information related to the tagged incomplete information field to the receiving device;
generate information related to tagged incomplete information field, wherein, the transmitting device is further configured to:
provide at least one tagging data field, wherein each of the plurality of information fields associated with one of a plurality of data elements of the metadata;
identify one of presence and absence of at least one of the plurality of information fields associated with the metadata being an equivalent of the at least one tagging data field;
capture as the tag data the at least one of the plurality of data elements associated with the at least one of the plurality of information fields being an equivalent of the at least one tagging data field in response to presence thereof being identified; and
request from the device the at least one of the plurality of data elements associated with the at least one of the plurality of information fields being an equivalent of the at least one tagging data field in response to absence thereof being identified.

20. The tagging system as in claim 19, further configured to establish a connection between the transmitting device and the receiving device.

21. The tagging system as in claim 20, wherein the connection between the transmitting device and the receiving device is a wireless connection.

22. The tagging system as in claim 21, wherein the connection is established through a re-broadcasting device, wherein the re-broadcasting device is configured to establish a first connection with the receiving device and a second connection with the transmitting device.

23. The tagging system as in claim 20, wherein the receiving device is further configured to determine whether the information fields are complete after the media file is completely received by the receiving device.

24. The tagging system as in claim 23, wherein the receiving device is further configured to determine whether the information fields are complete during playback of the media file.

25. The tagging system as in claim 20, wherein the receiving device is further configured to determine whether the information fields are complete upon initiation of sharing of the media file by the transmitting device.

26. The tagging system as in claim 19, wherein the receiving device is further configured to tag the incomplete information field of the metadata received by the receiving device using a user interface of the receiving device.

27. The tagging system as in claim 19, wherein the media file comprises one of audio, video and textual data.

28. The tagging system as in claim 19, wherein, the receiving device is further configured to compare each of the plurality of information fields associated with the metadata with at least one of a plurality of tagging criteria.

* * * * *